United States Patent [19]
Kelemen et al.

[11] Patent Number: 6,031,690
[45] Date of Patent: Feb. 29, 2000

[54] AIR FLOW ACTUATED LATCH FOR ACTUATOR ARM IN A DISC DRIVE

[75] Inventors: Andrew P. Kelemen, Thousand Oaks; Michael B. Moir, Newbury Park; Alexander W. Chang, Moorpark, all of Calif.

[73] Assignee: Seagate Technology, Inc., Scotts Valley, Calif.

[21] Appl. No.: 09/043,884

[22] PCT Filed: Mar. 31, 1998

[86] PCT No.: PCT/US98/06350

§ 371 Date: Mar. 31, 1998

§ 102(e) Date: Mar. 31, 1998

[87] PCT Pub. No.: WO98/44489

PCT Pub. Date: Oct. 8, 1998

Related U.S. Application Data

[60] Provisional application No. 60/042,168, Mar. 31, 1997.

[51] Int. Cl.$^7$ ........................................................ G11B 5/54
[52] U.S. Cl. ................................................................ 360/105
[58] Field of Search ............................................... 360/105

[56] References Cited

U.S. PATENT DOCUMENTS

| | | | |
|---|---|---|---|
| 5,319,511 | 6/1994 | Lin | 360/105 |
| 5,715,118 | 2/1998 | Tacklind | 360/105 |
| 5,793,572 | 8/1998 | Lalouette et al. | 360/105 |

*Primary Examiner*—Allen T. Cao
*Attorney, Agent, or Firm*—Flehr Hohbach Test Albritton & Herbert LLP

[57] ABSTRACT

An effective aerodynamic transducer latch is disclosed in which the latch mechanism is within the confines of a miniaturized disc drive structure, the latch being capable of reliably holding the actuator arm from uncontrolled movement away from a landing zone position in response to significant linear shocks exceeding 300 Gs, rotational shocks exceeding 15,000 radians/s$^2$, and combines a low cost, low-mass non-electrically powered latch mechanism cooperating with a disc drive actuator arm such that while the mass of the latch mechanism is significantly less than the mass of the actuator arm, the latch mechanism is capable of effectively restraining the arm against movement. Further, the design of an aerodynamically effective latch mechanism is such that it fits very closely adjacent to the voice coil motor such that a minimum amount of housing area needs to be devoted to the latch mechanism, the latch mechanism which when its restraining arm is latched against the actuator arm, provides the restraining force in a direction substantially parallel to the direction in which the actuator arm will attempt to move so that a maximum restraining force can be applied to the actuator arm and is incorporated within the confines of the predefined housing without adaptation of the design of the housing to accommodate the latch.

11 Claims, 4 Drawing Sheets

Air-Flow Loop

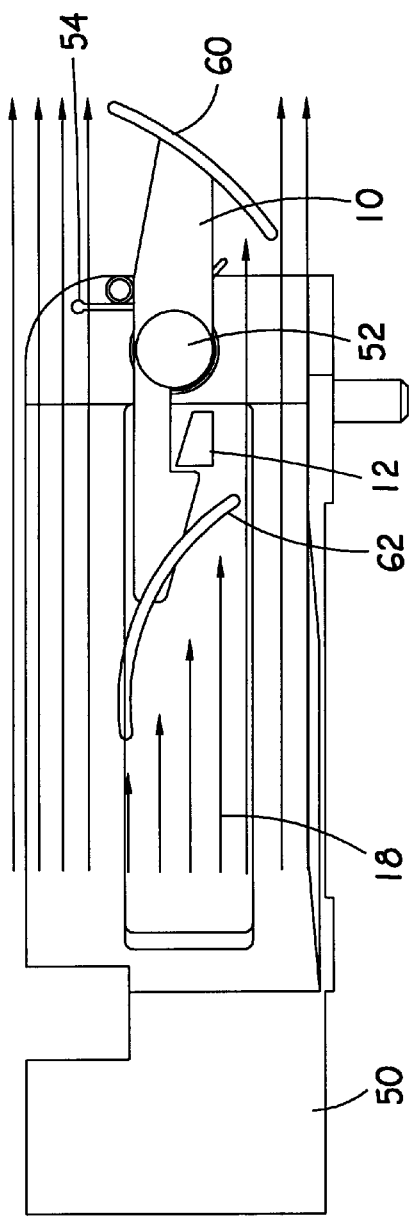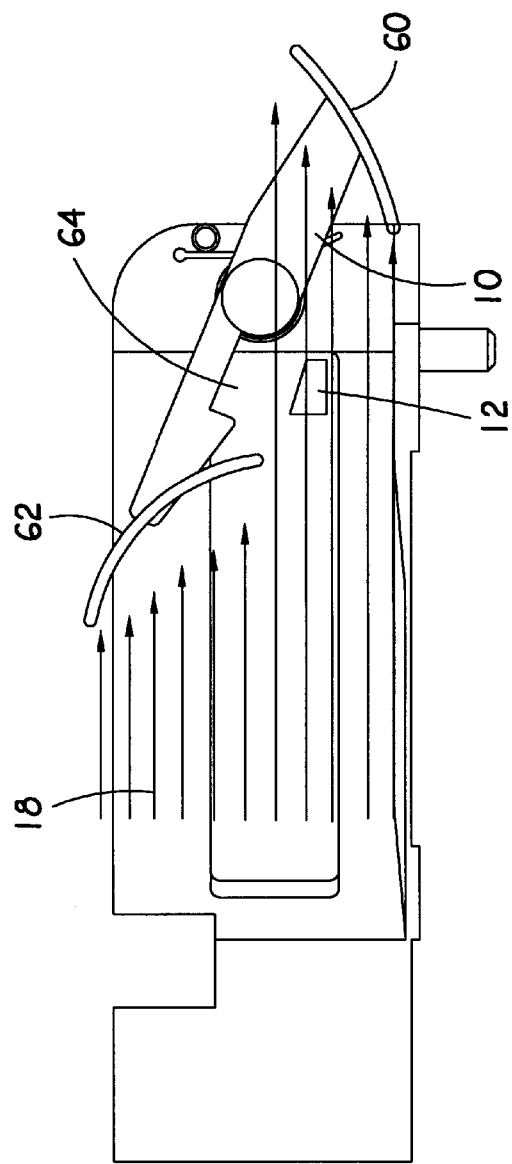

AIR FLOW ACTUATED LATCH FOR ACTUATOR ARM IN A DISC DRIVE

CROSS-REFERENCE TO RELATED APPLICATION

This application claims priority to U.S. Provisional Patent Application Ser. No. 60/042,168, filed Mar. 31, 1997, and entitled AIR-FLOW ACTUATED LATCH.

FIELD OF THE INVENTION

The present invention relates to a latch for releasably locking a disc drive actuator at a fixed position during power down conditions. The latch is intended to withstand considerable shock without allowing the actuator to be dislodged, thereby preventing damage to data storage discs having magnetic storage media coated or deposited thereon. More particularly, the present invention relates to an improved latch for a disc drive actuator assembly which releases automatically in response to the aerodynamic force generated by rotation of the storage disc, and which latches and recaptures the actuator arm and holds the arm and transducer supported thereby in fixed position.

BACKGROUND OF THE INVENTION

It is known in the technology that air flow is generated incident to the rotation of data storage discs in a disc drive. The characteristics of the air flow have been analyzed and discussed in the prior art, as for example, U.S. Pat. No. 4,647,997 to Westwood, and in the IBM Journal of Research and Development, November 1974, pages 480–488. It is known that two commonly mounted spaced apart rotating discs generates significantly greater air flow than generated by a single rotating disc, and that the amount of air flow is also known to be a function of disc diameter and angular velocity. The air flow force is greatest adjacent the periphery of the rotating disc and especially at the region defined between two rotating discs, and fall off rapidly as a nonlinear function as one moves away from the disc periphery.

In rotating, non-removable data disc storage devices, a data read/write transducer flies upon an air cushion or bearing in extremely close proximity to the data surface. In many disc drives, including those which are of extremely small size, that transducer lands upon and takes off from a particular predefined landing region. It is possible, when shocks are applied to the disc drive, that the transducer can move or bounce across the surface of the disc, causing erosion or scarring of the magnetic film coating on the disc surface leading to hard and soft data failures. In addition, the hard transducer head may dent the surface in response to sharp jarring forces attributable to sharp or rough handling of the drive.

While aerodynamically actuated latches have been described in the above referenced Westwood patent as well as in U.S. Pat. No. 4,538,193, such latches have not been effective because of a lack of the sensitivity and responsiveness to the available air flow, especially since disc drives must be built to withstand increasingly large shocks. Further, the spring force that restrains the transducer actuator assembly in the landing zone must be carefully selected so that the force can be overcome when the discs begin to move.

Thus, a need has arisen for a reliable latch mechanism responsive to the air flow generated in a small form factor disc drive to reliably latch and release the actuator mechanism, while restraining the actuator against relatively strong shocks.

SUMMARY OF THE INVENTION

A general object of the present invention is to overcome limitations and drawbacks to prior art aerodynamically operated latches for transducer actuated assemblies in a disc drive.

A further object of the invention is to provide an effective aerodynamic transducer latch mechanism within the confines of a miniaturized disc drive structure.

Another object of the present invention is to provide an effective, aerodynamically responsive transducer latch which is capable of reliably holding the actuator arm from uncontrolled movement away from a landing zone position in response to significant linear shocks exceeding 300 Gs and rotary (rotational) shocks exceeding 15,000 radians/s$^2$.

Another object of the present invention is to combine a low cost, low-mass non-electrically powered latch mechanism cooperating with a disc drive actuator arm such that while the mass of the latch mechanism is significantly less than the mass of the actuator arm, the latch mechanism is capable of effectively restraining the arm against movement.

Another object of the invention is to adopt a design of an aerodynamically effective latch mechanism which fits very closely adjacent to the voice coil motor such that a minimum amount of housing area needs to be devoted to the latch mechanism.

A further object of the present invention is to provide a latch mechanism which when its restraining arm is latched against the actuator arm, provides the restraining force in a direction substantially parallel to the direction in which the actuator arm will attempt to move so that a maximum restraining force can be applied to the actuator arm.

Another object of the present invention is to provide an aerodynamically responsive latch mechanism which is incorporated within the confines of the predefined housing without adaptation of the design of the housing to accommodate the latch.

The aerodynamically powered latch of the present invention is incorporated in a disc drive which includes a base casting defining a chamber, and a plurality or at least two rotating data storage discs journaled for rotation relative to the base casting on a spindle motor. A transducer actuator assembly is mounted in the chamber adjacent the rotating discs and supports data transducer heads in close proximity to a major data surface of each of the discs, and moves the heads from track to track over the surface of the disc. A latch mechanism is provided to latch the heads in a non-operating position typically close to the center of the disc although it may be adapted to latch the heads at the outer edge of the disc or even in a storage position on a ramp. The design comprises a latching arm mounted on the rear of the magnet/backiron which are located above and below the space for rotation of the actuator arm portion which supports the coil. A rod extending from the rear of the actuator arm extends toward, and preferably beyond the rear of the magnet/backiron so that it may be captured by the latch arm which is rotating about a pivot pin located immediately adjacent and parallel to the park position of this locking rod. The latch arm is normally biased by a spring on the pivot pin to capture and hold this locking rod in the absence of motor-driven rotation of the discs. When the discs rotate, a flow of air is created which passes through the region to the rear of the magnet/backiron of the voice coil motor; the latch arm resides in the flow loop of this air flow, and carries leading and trailing air foils which are both located in this air flow loop. The leading air foil shields the rear air foil from being contacted by any airstream when the latch is in the down position, with the latch arm engaging the locking rod and holding the actuator arms in their parked location. When a sufficient airstream in the air flow loop is created, the leading air foil is pushed in the clockwise direction against the bias force of the spring, gradually releasing the actuator arm locking rod. As it does so, the rear foil ceases to be shielded from the air flow by the front air foil, and now it also enters the airstream, creating a further rotational torque to cause the clockwise rotation of the latching arm, and holding the latching arm in a nonengaged fully clockwise position. The use of the dual air foils thus maximizes the torque against the spring bias by creating a coupled moment. Further, the torque is linearized by the fact that the leading air foil that is closest to the source of air flow is designed to be most efficient in the arm down position while the trailing foil is mounted on the latch arm at an angle to be most efficient in the arm up position where the air flows most smoothly over the air foil, urging the air foil in the clockwise direction. Thus the torque is maintained at a relatively constant level as the latch arm position changes during actuation. This design further allows the arm to be balanced about the pivot point, a very important consideration in linear shock tolerance.

This design also allows the latch arm axis of rotation to be oriented orthogonal to the actuator axis of rotation, resulting in a very high rotational shock tolerance.

The air flow loop is optimized by providing air deflectors extending from the end of the magnet/backiron combination in a generally arcuate path toward the center of the discs, so that the air flow generated by the spinning discs passes between these air deflectors and the side of the housing and is channeled thereby behind the magnet/backiron of the voice coil motor, impacting the air flow actuated latch with an optimum amount of force when the discs are rotating.

Other objects, advantages and features of the present invention will be better understood and appreciated from a consideration of the following detailed description of a preferred embodiment presented in conjunction with the accompanying figures.

BRIEF DESCRIPTION OF THE DRAWINGS

FIGS. 3A and 3B are schematic views of the latch arm and air foils as they are presented to the airstream, with FIG. 3A showing the latch in the down position where the rear foil is not active in the airstream, and FIG. 3B showing the latch in the up position where the actuator arm is released and the rear foil has fully entered the airstream.

DETAILED DESCRIPTION OF A PREFERRED EMBODIMENT

Figure 1:
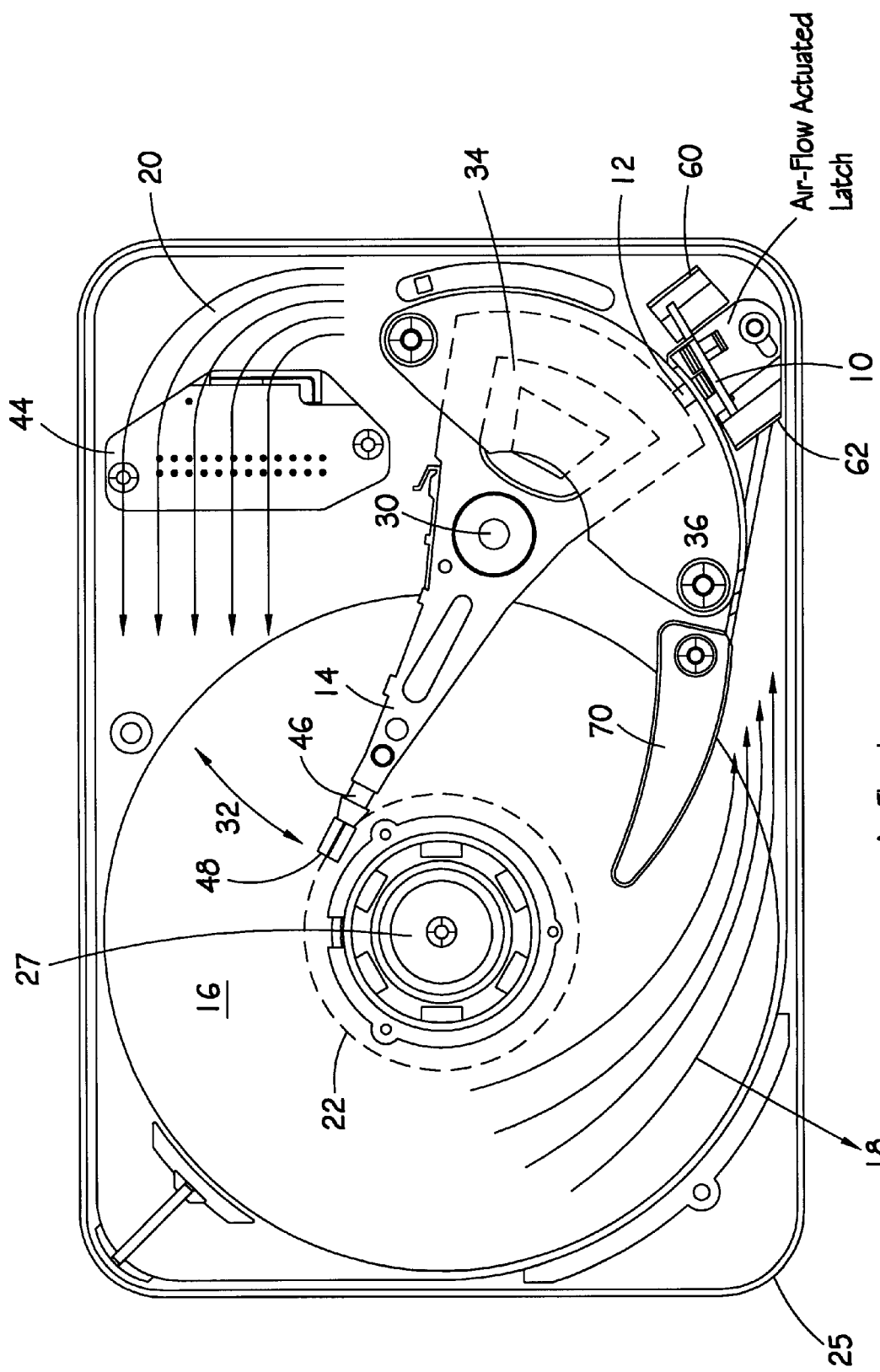
FIG. 1 is a diagrammatic enlarged top plan view of a disc drive incorporating the principal features of the present invention with the latch shown in the engaged position.
Figure 2:
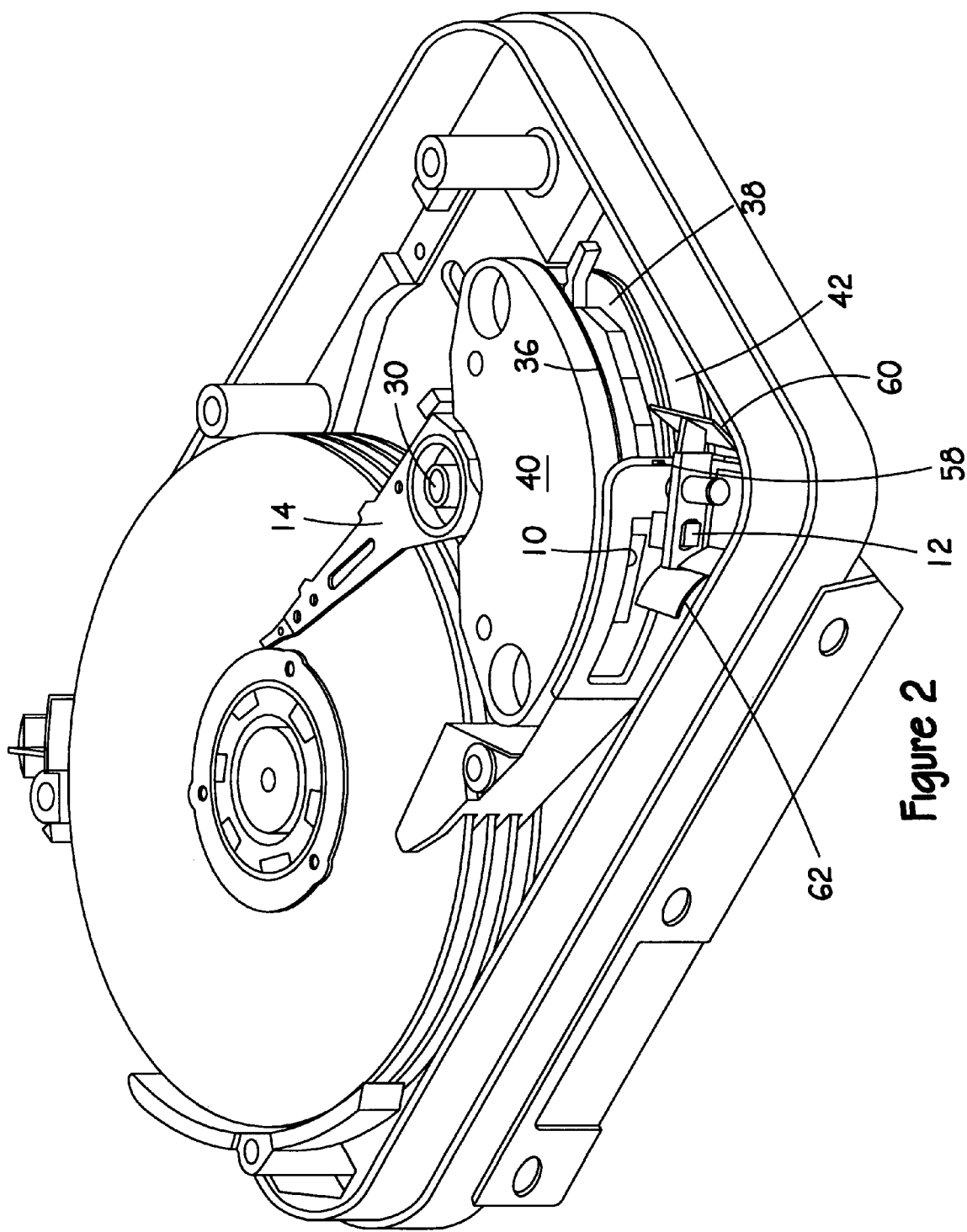
FIG. 2 is a partial perspective view of several of the major elements of a disc drive incorporating the present invention including the air deflection vanes and the latch arm.

A disc drive constructed in accordance with the principles of the present invention is illustrated in the top plan view of FIG. 1 and again in the perspective view of FIG. 2. Both FIGS. 1 and 2 show the latch arm in the activated position where the arm 10 engages a locking pin 12 which extends from the rear of the actuator arm 14. This engagement of extension rod 12 is clearly shown in the perspective view of FIG. 2; for contrast, FIG. 1 illustrates the air flow loop which is created by the rotation of the discs 16. As these discs rotate, air flow as represented by the arrows 18, 20 on either side of the actuator arm is sufficient to actuate the latch, causing a clockwise rotation to release the locking rod 12 and allow rotation of the actuator arm 14. This rotation will be further explained with respect to FIGS. 3A and 3B.

The disc drive shown in FIGS. 1 and 2 includes a unitary housing 25 which supports a spindle motor (not shown) whose spindle has an axis of rotation 27 and supports the discs 16. The rotation of the spindle motor causes rotation of the discs 16 and generates the air flow indicated by the arrows 18 and 20; the rotation is at a predetermined and constant velocity.

In the disc drive, the data storage discs 16 provide data storage surfaces on the data storage regions on tracks on the upper and lower surfaces of each disc. The surfaces are characterized by the presence of suitable magnetic storage media which are coated, plated or deposited on the surface of the disc. A rotary actuator arm 14 is provided which is journaled to the base casting 25 about an axis of rotation 30. The actuator arm 14 rotates bidirectionally over each surface of each disc as indicated by the arrow 32. This rotation is controlled by a voice coil motor on the rear of the actuator arm comprising a coil generally indicated at 34 which lies between a pair of permanent magnets 36, 38 (see FIG. 2) each of which is typically supported from a backiron 40, 42 to enhance the flux concentration in the active region of the motor. Energization of the coil by current supplied to the coil from a control source 44 causes selective movement of the actuator arm along the path indicated by the arrow 32 to move the transducer support arm 46. Each transducer support arm 46 supports a transducer 48 which is used to access the data storage locations on the surface of each disc.

Each disc data storage surface is characterized by multiple circular annular data tracks on which these data storage locations are defined. An inner landing zone, typically the width of several of these tracks and comprising typically the innermost region of the storage disc, comprises a region 22 devoted to landing and takeoff of the transducer/slider assembly 48. The remaining region of the surface of the disc which comprises the concentric annular data tracks is accurately accessed by movement of the actuator arm 14 to cause the transducer 48 to be located over one of the data tracks. When the disc drive is no longer in use, then the actuator arm moves the transducer 48 to land over the landing zone 52 and rest on the surface of the discs 16. At this point, the latch engagement arm 10 engages the locking rod or pin 12 which extends from the rear of the actuator arm 14 which supports the voice coil motor to firmly hold the transducer in the landing zone so that in the event of even a severe shock to this disc drive, the transducer cannot be dislodged and slide across the surface of the disc, causing damage to either or both of the surface of the disc and the transducer 48.

Figure 4A:
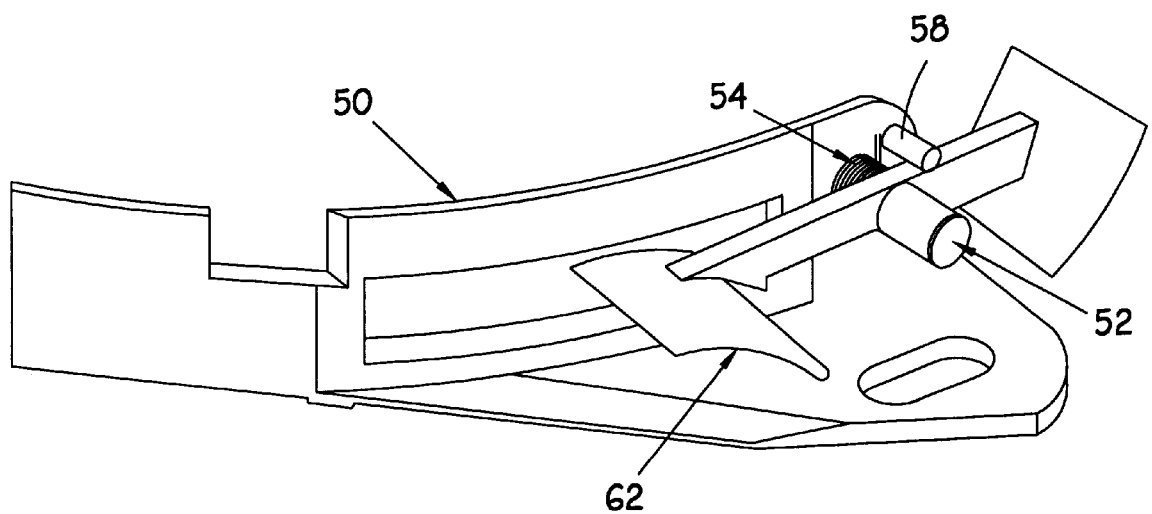
FIGS. 4A, 4B, and 4C are perspective views of the primary mechanical elements of the present invention including the latch arm frame (FIG. 4A), the bias spring (FIG. 4B), and the mounting pin (FIG. 4C).
Figure 4B:
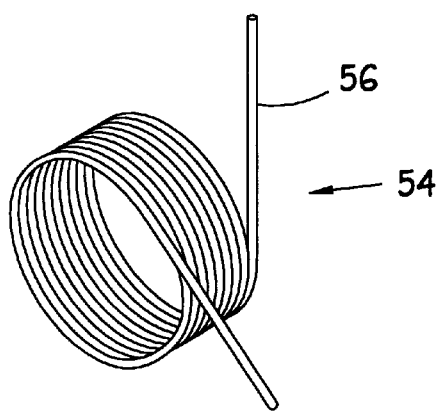
Figure 4C:
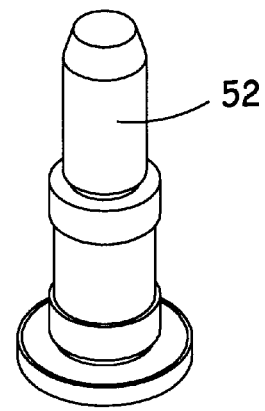

The latch arm is shown in both latched and unlatched positions in FIGS. 3A and 3B, respectively. As can be seen by comparing FIGS. 3A and 3B with FIG. 2, the latch arm is journaled to a frame 50 which is supported from the rear of the voice coil motor magnets and backirons, by a post 52. The frame 50 is shown in perspective in FIG. 4A; the post 52 is shown in perspective view in FIG. 4C; the latch arm 10 is normally biased into the latching position shown in FIG. 2 and FIG. 3A by a spring 54 shown in FIG. 4B. A review of FIG. 4A makes it apparent that the spring 54 is mounted on post 52 between frame 50 and arm 10 with the spring's trailing leg 56 pressed against a post 58 on the frame so that the arm 10 is normally biased into the latch down position. In this position, the rear foil 60 mounted on the rear edge of the arm 10 is completely shielded from the airstream 18 (see FIG. 3A).

The leading air foil 62 is mounted on the leading edge of the arm 10 and curved to capture the effect of the airstream 18 when the discs begin to turn. This leading air foil 62 is at its maximum effectiveness in causing the initiation of clockwise rotation of the locking arm as the windstream 18 is created by the rotation of the discs 16. As the arm 10 rotates in the clockwise direction under the impetus of the airstream 18 pressing against the leading airfoil 62, the rear air foil emerges from the shadow of the leading air foil and begins to be impacted by the airstream 18. As this occurs, the airstream passing over the slightly concave surface of the air foil tends to also force this foil to move the arm 10 in a clockwise direction. As the discs reach full speed and the windstream 18 is fully established, the somewhat convex leading air foil 62 (that is convex relative to the pin 52) and the concave rear air foil 60 both are now engaged by the airstream to move the locking arm 10 to its maximum clockwise position, and hold it there. This allows the actuator locking pin 12 to emerge from the notch 64 of the locking arm 10, leaving the actuator arm 14 free to move along the path of the arrow 32 in response to commands from the control interface 44.

Although the airstream 18 would have a natural tendency to pass behind the magnets and backiron of the voice coil motor, the stream effectiveness is enhanced by providing air deflector blades 70 shown in the top plan view of FIG. 1 and more clearly in the perspective view of FIG. 2. These air deflectors are also mounted to the rear of the magnets 36, 38 and backirons 40, 42 and extend preferably along a slightly curved path under and between the discs and toward the center spindle 27 of the motor. By providing these air deflectors 70 to fill the gaps between the discs and to substantially fill any gap between the upper disc and the top of the housing and the lower disc of the bottom of the housing, the airstream 18 is most effectively channeled behind the magnets and backiron of the voice coil motor and into engagement with the front and rear air foils 62, 60 of the latch arm. This allows the latch arm to be placed in the optimum location for positively engaging the actuator arm to the rear of the actuator, and in an optimal position for positively engaging the extension pin 12 of the latch arm, with the axis of rotation of the latch arm 10 orthogonal to the actuator arm 14.

The design of the latch arm with the leading and trailing air foils 62, 60 creates a number of advantages. These advantages including that torque is maximized by creating a coupled moment to cause and maintain rotation of the latch arm 10 against the biasing force of the spring 54. Further, the torque is linearized since the leading foil 62 is designed to be most efficient in the arm down position while the trailing foil 60 is most efficient in the arm up position. Therefore, the torque that is generated (by the system) as the arm changes position proportionally counteracts the resisting torque created by the torsion spring as illustrated in FIGS. 3A and 3B. Finally, the use of both front and rear air foils 62, 60 allows the latch arm to be balanced about the pivot point defined by the pivot pin 52, an important consideration in tolerating linear shock. The orthogonal orientation of the latch arm relative to the actuator arm results in a very high rotational shock tolerance. Thus, the design achieves its goals of tolerating a very high level of linear shock and rotational shock while providing a substantially more positive latching effect than the magnetic latches and even the air vane driven latches of the prior art.

Other features and advantages of the present invention will become apparent to a person of skill in the art who studies the present invention disclosure. Therefore, the scope of the present invention is to be limited only by the following claims.

What is claimed is:

1. An aerodynamic latch system for use in a disc drive having at least two discs supported for counterclockwise rotation about a central spindle, a chamber defined by a housing for said discs, and an actuator arm mounted from a base of said housing, said actuator arm supported for rotation about a shaft, said actuator arm supporting a transducer in close proximity to a surface of a disc of said discs, and a voice coil motor at an opposite end and on an opposite side of said shaft for moving said transducer from track to track over said surface of the disc in response to commands to said motor, said actuator arm further including a locking pin extending substantially radially away from an axis of said shaft of said actuator arm proximal said voice coil motor, and a latch arm mounted orthogonal to a pivot pin comprising a pivot to support said latch arm, said latch arm having a leading air foil and a trailing arm foil mounted in balancing positions on either side of said pivot and responsive to a flow loop of air generated by said spinning discs and passing behind said voice coil motor to change positions rotatably about an axis of said pivot from a first position latching said actuator arm cooperatively with said locking pin to a second position, thereby unlocking said locking pin and allowing free rotation of said actuator arm about an axis of said shaft.

2. An aerodynamic latch as claimed in claim 1 wherein a frame supports said pivot pin which in turn supports said latch arm of said aerodynamic latch is mounted to a rear portion of said semicircular magnet and backiron distal said shaft of said actuator arm so that said pivot pin is substantially parallel to said locking pin of said actuator arm and a long axis of said latch arm is orthogonal to said actuator arm axis of rotation.

3. An aerodynamic latch as claimed in claim 1 wherein said latch arm has the leading air foil and the trailing air foil mounted on opposite sides of said latch arm pivot, said leading air foil shadowing said trailing air foil from said air flow in said first position of said latch arm whereby unlocking of said actuator arm is delayed until a desired air flow is achieved.

4. An aerodynamic latch as claimed in claim 3 wherein said leading air foil is generally convex shape with respect to said pivot and said trailing edge foil is a generally concave shape with respect to said pivot.

5. An aerodynamic latch as claimed in claim 4 including a spring mounted about said pivot which journals said latch arm to said frame and biases said latch arm into said first position for locking said actuator arm.

6. An aerodynamic latch as claimed in claim 5 including a notch in said latch arm located closely adjacent said pivot and intermediate said leading and trailing edges and intermediate said leading air foil and said pivot and engaging said locking pin of said actuator arm to prevent movement of said actuator arm when said disc in said disc drive is not rotating.

7. An aerodynamic latch as claimed in claim 6 including a plurality of air deflector blades which are located at least intermediate said disc in said disc drive to deflect air flow generated by a rotation of said disc of said disc drive behind a rearmost portion of said voice coil motor.

8. An aerodynamic latch as claimed in claim 7 wherein said voice coil motor includes a magnet and backiron, generally semicircular in shape and extending above and below a rotational path of said actuator arm which supports a coil of said voice coil motor between said first and second magnet and backiron, said air flow passing behind each of said generally semicircular magnet and backiron frames.

9. An aerodynamic latch system for use in a disc drive having at least two discs supported for counterclockwise rotation about a central spindle, a chamber defined by a housing for said discs, and an actuator arm mounted from a base of said housing supported for rotation about a shaft, said actuator arm supporting a transducer in close proximity to a data surface of one disc of said discs, and an actuator motor at an opposite end and on an opposite side of said shaft for moving said transducer from track to track over a surface of said one of said discs in response to commands to said motor, and supporting means for latching means latching said actuator arm to hold said arm motionless relative to said discs when said discs are at rest, said supporting means supporting latching means for rotation perpendicular to said motion of said actuator arm, said latching means comprising a latch arm balanced for rotation about said supporting means.

10. An aerodynamic latch as claimed in claim 9 wherein said latching means comprise first and second air-flow responsive means mounted on the latch arm to move said latch arm from a locking position to an unlocking position in response to significant airflow caused by disc rotation.

11. An aerodynamic latch as claimed in claim 10 wherein said first air flow responsive means from air flow generated by rotation of said discs delay initiating movement of said latch arm from a locking position to an unlocking position until the significant air flow is established.

* * * * *